(12) United States Patent
Boland (10) Patent No.: US 9,919,683 B2
(45) Date of Patent: Mar. 20, 2018

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 798 days.

(21) Appl. No.: 14/365,733

(22) PCT Filed: Dec. 15, 2011

(86) PCT No.: PCT/EP2011/072901
§ 371 (c)(1),
(2), (4) Date: Oct. 1, 2014

(87) PCT Pub. No.: WO2013/087109
PCT Pub. Date: Jun. 20, 2013

(65) Prior Publication Data
US 2015/0026910 A1   Jan. 29, 2015

(51) Int. Cl.
*B60S 1/38* (2006.01)

(52) U.S. Cl.
CPC ........... *B60S 1/3848* (2013.01); *B60S 1/3808* (2013.01); *B60S 1/3874* (2013.01); *B60S 1/3887* (2013.01); *B60S 1/3891* (2013.01); *B60S 1/3893* (2013.01)

(58) Field of Classification Search
CPC .... B60S 1/3886; B60S 1/3893; B60S 1/3894; B60S 1/3887; B60S 1/3808; B60S 1/3891; B60S 1/3896; B60S 1/3848
(Continued)

(56) References Cited

U.S. PATENT DOCUMENTS

2006/0246000 A1   11/2006  Dolling et al.
2006/0282972 A1*  12/2006  Huang ................... B60S 1/381
                                                       15/250.201
2008/0222833 A1    9/2008  Henin et al.

FOREIGN PATENT DOCUMENTS

DE    42 28 284 A1    3/1993
DE    10122764 A1 *   2/2003
(Continued)

OTHER PUBLICATIONS

Machine language translation of description portion of DE10122764A1, published Feb. 2003.*
(Continued)

*Primary Examiner* — Gary Graham
(74) *Attorney, Agent, or Firm* — Robert L. Stearns; Dickinson Wright, PLLC (57) ABSTRACT

A windscreen wiper device of the flat blade type includes an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein free ends of the wiper blade are connected to a respective connecting piece, which windscreen wiper device comprises a connecting device for an oscillating wiper arm, and wherein the wiper blade is provided with a spoiler at a side thereof facing away from the windscreen to be wiped, wherein at least one connecting piece comprises an internal transverse reinforcement rib, wherein the spoiler is removed along a portion of the length of the wiper blade; at a distance from a free end of the wiper blade facing the connecting piece so as to form a transverse slit, and wherein in mounted position the internal transverse reinforcement rib rests inside the slit.

15 Claims, 6 Drawing Sheets

(58) Field of Classification Search
USPC .......................... 15/250.43, 250.44, 250.451
See application file for complete search history.

(56) References Cited

FOREIGN PATENT DOCUMENTS

| | | |
|---|---|---|
| DE | 10 2008 017249 A1 | 10/2009 |
| DE | 10 2009 029432 A1 | 3/2011 |
| DE | 10 2010 042095 A1 | 4/2011 |
| EP | 2098420 A1 * | 9/2009 |
| FR | 2 905 650 A1 | 3/2008 |
| JP | 2005 059644 A | 3/2005 |
| JP | 2007313908 A | 12/2007 |
| JP | 2009513404 A | 4/2009 |
| JP | 2009513464 A | 4/2009 |
| WO | WO2007/122569 A2 * | 11/2007 |
| WO | WO2012/159802 A1 * | 11/2012 |

OTHER PUBLICATIONS

Machine language translation of description portion of JP2005059644A, published Mar. 2005.*

* cited by examiner

WINDSCREEN WIPER DEVICE

BACKGROUND OF THE INVENTION

1. Technical Field

The invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein free ends of the wiper blade are connected to a respective connecting piece, which windscreen wiper device comprises a connecting device for an oscillating wiper arm, and wherein the wiper blade is provided with a spoiler at a side thereof facing away from the windscreen to be wiped.

2. Related Art

Such a windscreen wiper device is generally known. The prior art windscreen wiper device is in particular designed as a "flat blade" or "yokeless blade", wherein use is no longer made of several yokes pivotally connected to each other, but wherein the wiper blade is biased by the carrier element, as a result of which it exhibits a specific curvature. One drawback of the prior art windscreen wiper device is the fact that the connecting pieces (in practice also called "end caps") and the wiper blade are not connected in a durable, solid manner. Particularly, when high forces are exerted on the wiper blade, the wiper blade may come loose from the connecting pieces. As a result, the life span of the prior art windscreen wiper device may be seriously shortened.

SUMMARY OF THE INVENTION

The object of the invention is to overcome this drawback of the prior art as indicated above, in particular to provide a windscreen wiper device wherein the wiper blade may not come loose from the connecting pieces.

In order to accomplish that objective, a windscreen wiper device of the kind referred to in the introduction is characterized according to the invention in that at least one connecting piece comprises an internal transverse reinforcement rib, wherein the spoiler is removed along a portion of the length of the wiper blade at a distance from a free end of the wiper blade facing towards the connecting piece so as to form a transverse slit, and wherein in mounted position the internal transverse reinforcement rib rests inside the slit. In the framework of the present invention the connecting piece is in the form of an end cap, wherein the reinforcement rib is located inside the end cap, and wherein the end cap and the reinforcement rib are preferably made of one piece of plastic material. the transverse rib and the transverse slit extend in a direction perpendicular to the longitudinal direction of the wiper blade and in the plane of the windscreen to be wiped. Preferably, a moulding operation would ensure that the connecting piece and the reinforcement rib can be formed in a reliable and controllable manner, without high costs as far as additional tools and equipment are concerned. Upon mounting the connecting piece onto a respective free end of the wiper blade the internal reinforcement rib is particularly snapped or "clicked" into the transverse slit. The wiper blade is particularly made of an elastomeric material through an extrusion operation.

Because the connecting piece is connected to the wiper blade without any connection between the connecting piece and the strip, the connecting piece closes the groove in a dust tight and watertight manner. This implies that any decrease in mobility between the wiper blade and the strip due to any dust inside the groove is avoided, whereas any corrosion of the strip due to any (rain) water inside the groove can be avoided as well.

It is noted that the present invention is not restricted to windscreen wiper devices for cars, but that it also relates to windscreen wiper devices for rail coaches and all other (fast) vehicles.

The transverse slit in the spoiler is preferably realized through a cutting operation. The cutting operation ensures that the spoiler is locally removed in its entirety in a reliable and controllable manner.

In a preferred embodiment of a windscreen wiper device in accordance with the invention the height of the slit corresponds to the height of the internal transverse reinforcement rib. Preferably, a part of the spoiler extending from the free end of the wiper blade to the slit has an inclined upper surface with an inclination angle lying within the range of 0 and 45°. The upper surface extends upward, seen from a respective free end of the wiper blade. Such an inclination ensures that the connecting piece can be easily connected to a respective free end of the wiper blade, using less force, while disconnecting the connecting piece requires more force. The connecting piece will therefore not come loose easily from the wiper blade. the inclined upper surface may be straight or curved.

In another preferred embodiment of a windscreen wiper device according to the invention the height of the slit is larger than the height of the internal transverse reinforcement rib. Particularly, a part of the spoiler extending from the free end of the wiper blade to the slit has an inclined upper surface with an inclination angle lying within the range of 0 and 45[deg.]. The upper surface again extends upward, seen from a respective free end of the wiper blade. Such an inclination facilitates connection of the connecting piece to a respective free end of the wiper blade, using less force, while it makes it difficult to disconnect the connecting piece, requiring more force. the inclined upper surface may be straight or curved.

In another preferred embodiment of a windscreen wiper device in accordance with the invention upon mounting of the connecting piece the wiper blade at a location facing the connecting piece is extracted outwardly so as to allow the internal transverse reinforcement rib to move into the slit. In other words, by pulling an elastomeric material (rubber, for example) of the wiper blade in outward direction, the connecting piece and the wiper blade are interconnected while the longitudinal strip may not interfere at the location of their interconnection. By subsequently allowing the elastomeric material (rubber, for example) of the wiper blade to withdraw, the longitudinal strip helps retaining the connecting piece onto the wiper blade. In another preferred embodiment of a windscreen wiper device according to the invention the connecting piece is connected to the wiper blade by a snapping operation by sliding the connecting piece onto the wiper blade in longitudinal direction thereof until the reinforcement rib snaps into the transverse slit. In the alternative, the connecting piece is connected to the wiper blade by rotating the connecting piece onto the wiper blade until the reinforcement rib rests inside the transverse slit. In the latter case, glue may be applied to fixate the connecting piece onto a respective free end of the wiper blade.

In another preferred embodiment of a windscreen wiper device in accordance with the invention the connecting piece comprises engaging members sidewardly engaging the wiper blade from the outside, wherein the engaging members comprise retaining means for retaining the wiper blade onto the connecting piece. Particularly, the engaging members and the retaining means are in one piece. Preferably, a moulding operation would ensure that the engaging members and the retaining means can be formed in a reliable and controllable manner, without high costs as far as additional tools and equipment are concerned.

In another preferred embodiment of a windscreen wiper device according to the invention the engaging members and the retaining means are formed by inwardly bent parts of edges of lateral sides of the connecting piece.

In another preferred embodiment of a windscreen wiper device in accordance with the invention a cross plane through a free end of the internal transverse reinforcement rib extends through the retaining means.

In another preferred embodiment of a windscreen wiper device according to the invention the retaining means comprises at least one sidewardly extending gripping tooth for gripping an intermediate web of the wiper blade. Particularly, the retaining means comprises at least two sidewardly extending, opposing gripping teeth.

THE DRAWINGS

The invention will now be explained in more detail with reference to figures illustrated in a drawing, wherein.

DETAILED DESCRIPTION OF THE EMBODIMENTS

Figure 1:
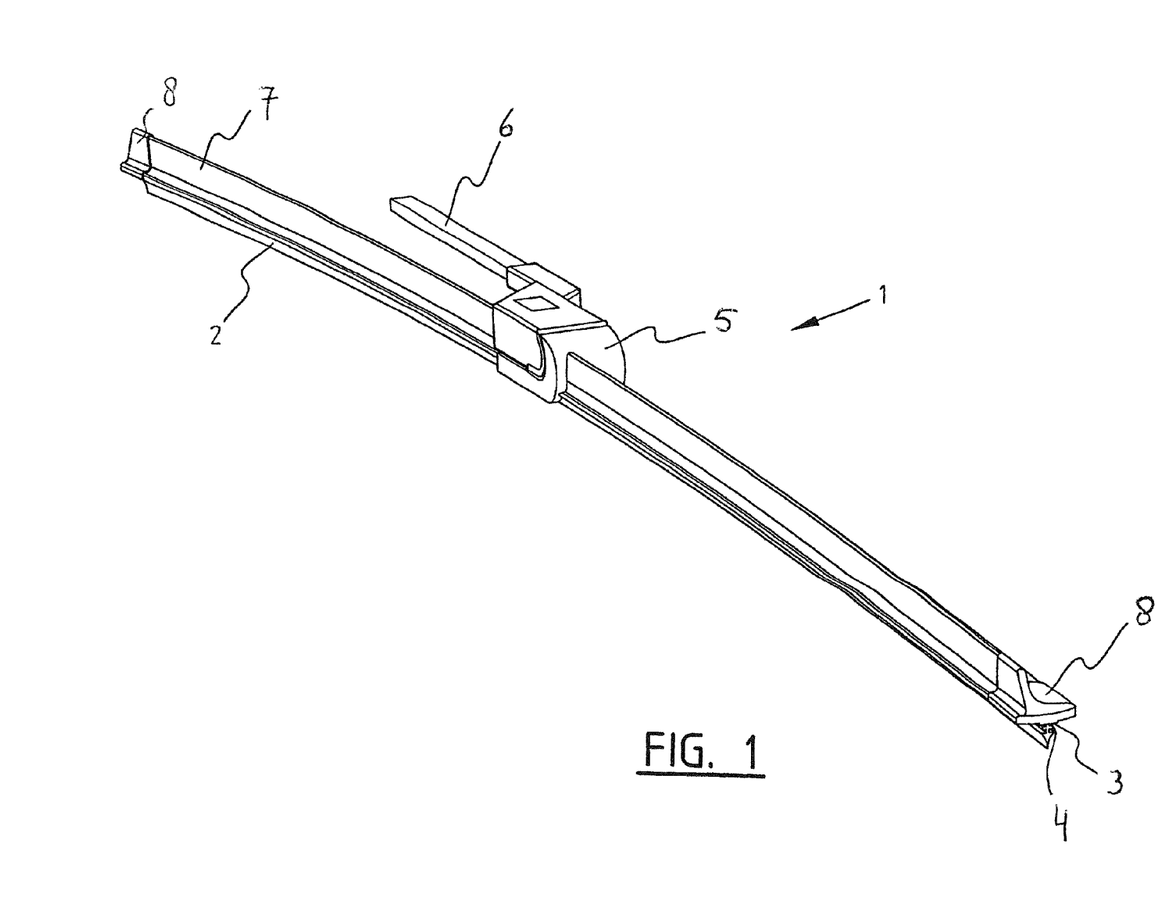
FIG. 1 is a perspective, schematic view of a windscreen wiper device in accordance with the invention.

FIG. 1 shows a preferred variant of a windscreen wiper device 1 according to the invention. the windscreen wiper device 1 is built up of an elongated wiper blade 2 made of an elastomeric material. the wiper blade 2 comprises a central longitudinal groove 3, in which a longitudinal strip 4 or flexor made of spring band steel is fitted. the strip 4 forms a flexible carrier element for the rubber wiper blade 2, as it were, which is thus biased in a curved position (the curvature in operative position being that of a windscreen to be wiped).

The windscreen wiper device 1 is further equipped with a connecting device 5 for an oscillating arm 6, and a spoiler 7 made in one piece with the wiper blade 2. At both ends of the wiper blade 2, that is on either side of the windscreen wiper device 1, connecting pieces 8 are provided.

Figure 2:
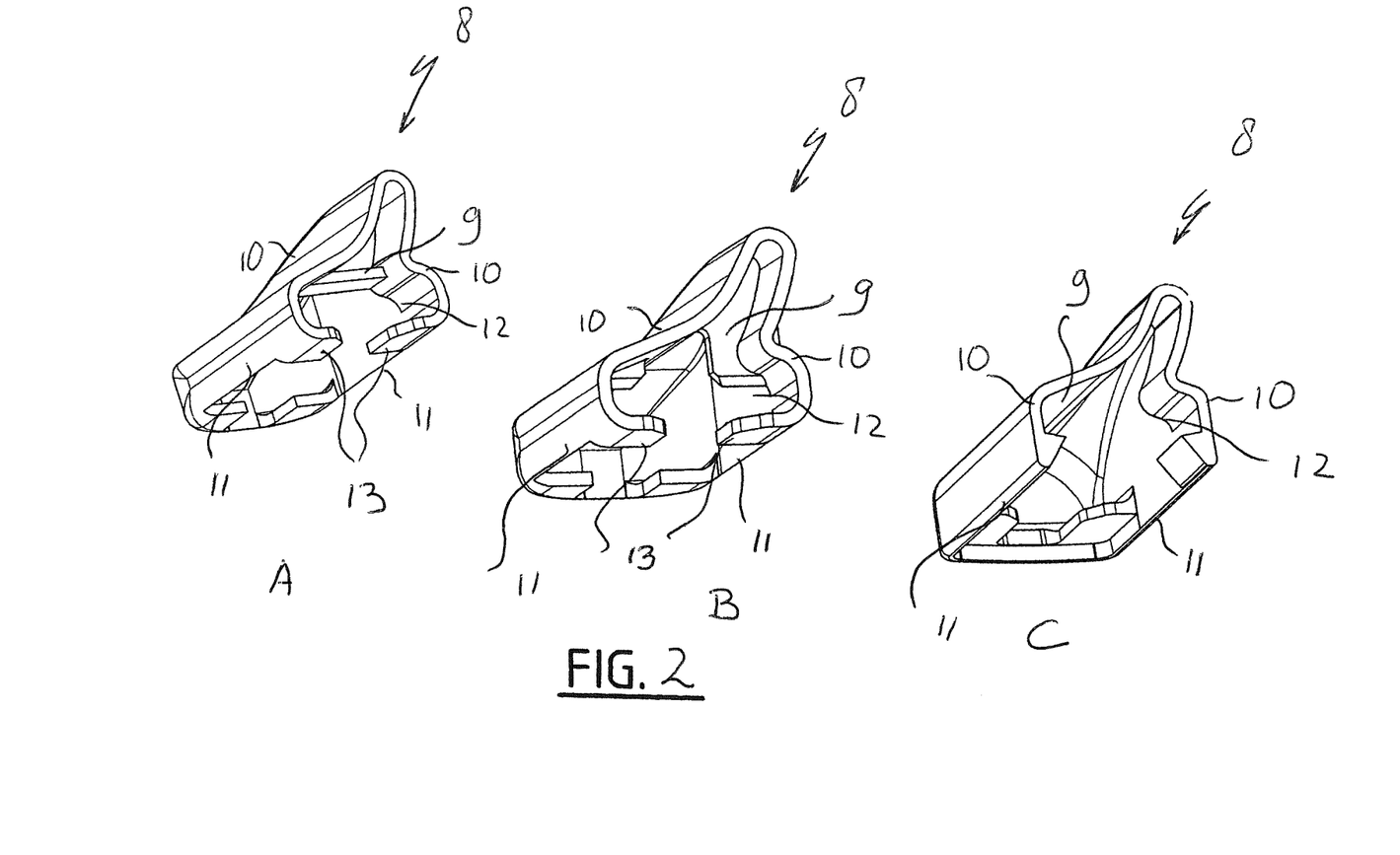
FIG. 2 is a perspective, schematic view of a connecting piece or end cap used in the windscreen wiper device of FIG. 1 according to a first embodiment A, a second embodiment B and a third embodiment C.

As can be seen in FIG. 2, the connecting pieces or end caps 8 according to embodiments A, B and C each have a bending stiffness in transverse or lateral direction. This is realized by providing the end cap 8 with an internal transverse reinforcement rib 9. the internal reinforcement rib 9 enhances the stiffness of the end cap 8 in transverse or lateral direction, allowing the end cap 8 to firmly retain the wiping blade 2 thereon.

With reference to FIG. 2, lateral sides 10 of each end cap 8 are provided with engaging members 11 made integral therewith, wherein the engaging members 11 engage around an upper part of the wiper blade 2, so as to form a groove 12 for sliding the upper part therein (embodiments A and B) or by rotating the upper part therein (embodiment C). Further, the engaging means 11 include sidewardly extending gripping teeth 13 made integral therewith, wherein the gripping teeth 13 grip into an intermediate web of the wiper blade 2. It is noted that the teeth 13 may only slightly penetrate the elastomeric (rubber) material of the wiper blade 2, without damaging the same.

According to the invention the end caps 8 are connected to the wiper blade 2 without any connection between the end caps 8 and the strip 4.

Figure 3:
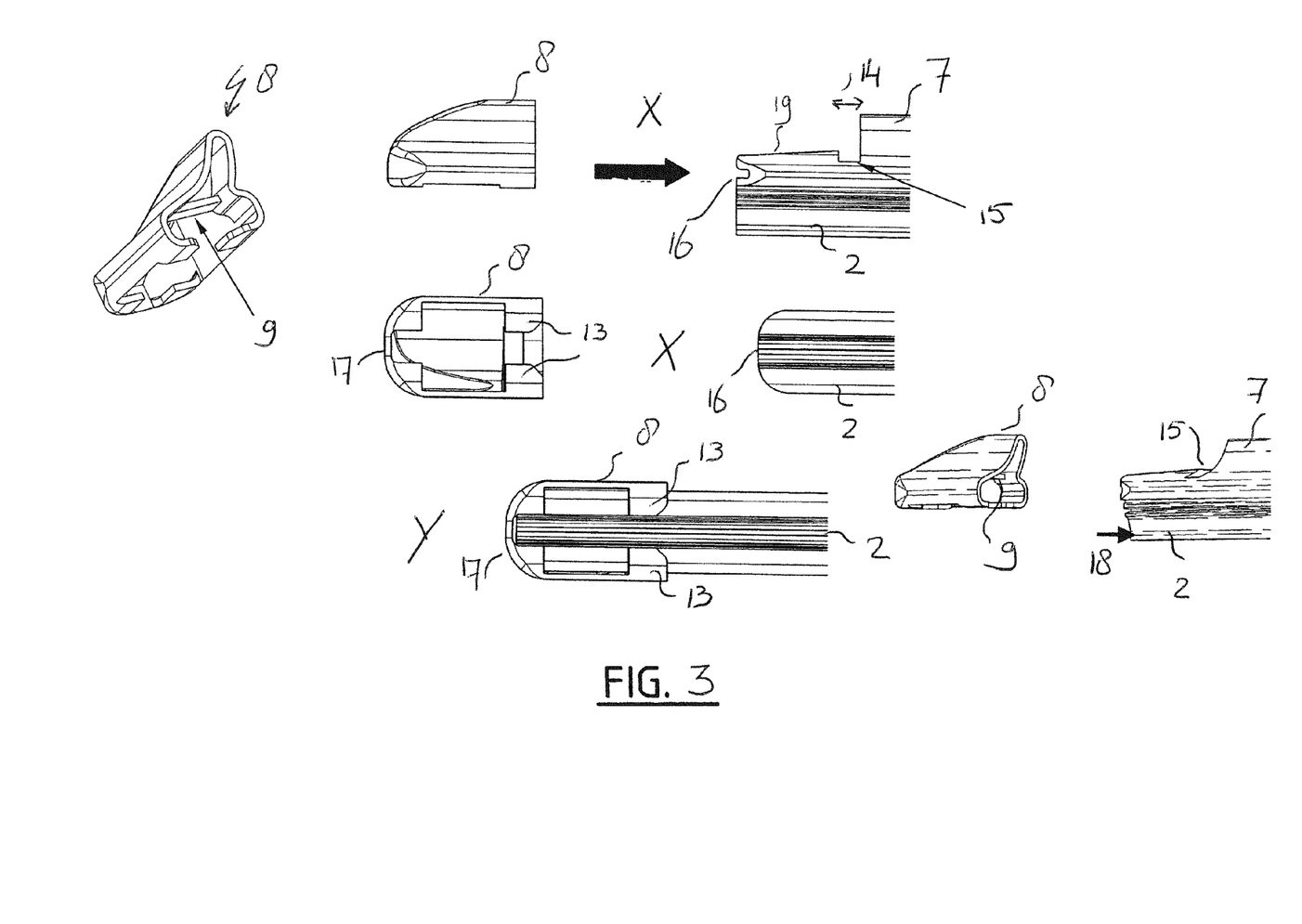
FIGS. 3 and 4 in steps show how the end cap of embodiment A is mounted onto a respective free end of a wiper blade (in two different embodiments) used in the windscreen wiper device of FIG. 1.
Figure 4:
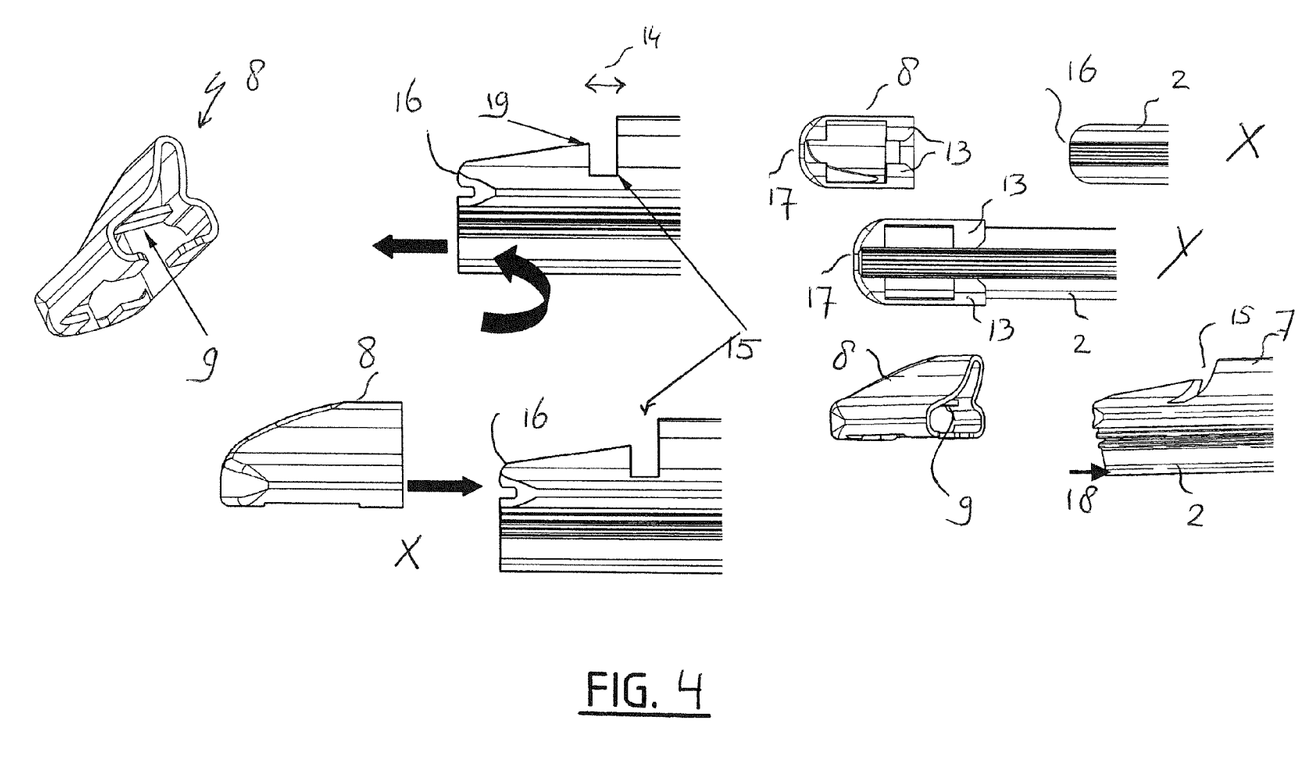

With reference to FIG. 3, the spoiler 7 is removed along a portion 14 of the length of the wiper blade 2 at a distance from a free end of the wiper blade 2 facing the end cap 8, so as to form a transverse slit 15. Mounting of the end cap 8 onto the free end of the wiper blade 2 is realized as follows. First, the end cap 5 is freely slided onto the respective free end of the wiper blade 2 (side view of situation X and bottom view of situation X) until the reinforcement rib 9 is snapped or "clicked" into the transverse slit 15 (bottom view of situation Y). As shown in FIG. 3, the free end of the wiper blade 2, at the location of the upper part thereof is cut in order to have a curved extremity, so that the upper part of the wiper blade 2 (designated with reference numeral 16) is able to follow a curvature of the end wall 17 of the end cap 8. In order to freely slide the end cap 8 onto the free end of the wiper blade 2, the wiper blade 2 is pinched at a location 18 thereof in order to pull the wiper blade 2 in outward direction. FIG. 4 corresponds to FIG. 3, wherein corresponding parts have been designated with the same reference numerals, on the understanding that in FIG. 3 a part of the spoiler 7 extending from the free end of the wiper blade 2 to the slit 15 has an inclined upper surface 19 with an inclination angle of 5°, whereas in FIG. 4 the inclined upper surface 19 has an inclination angle of 20°.

Figure 5:
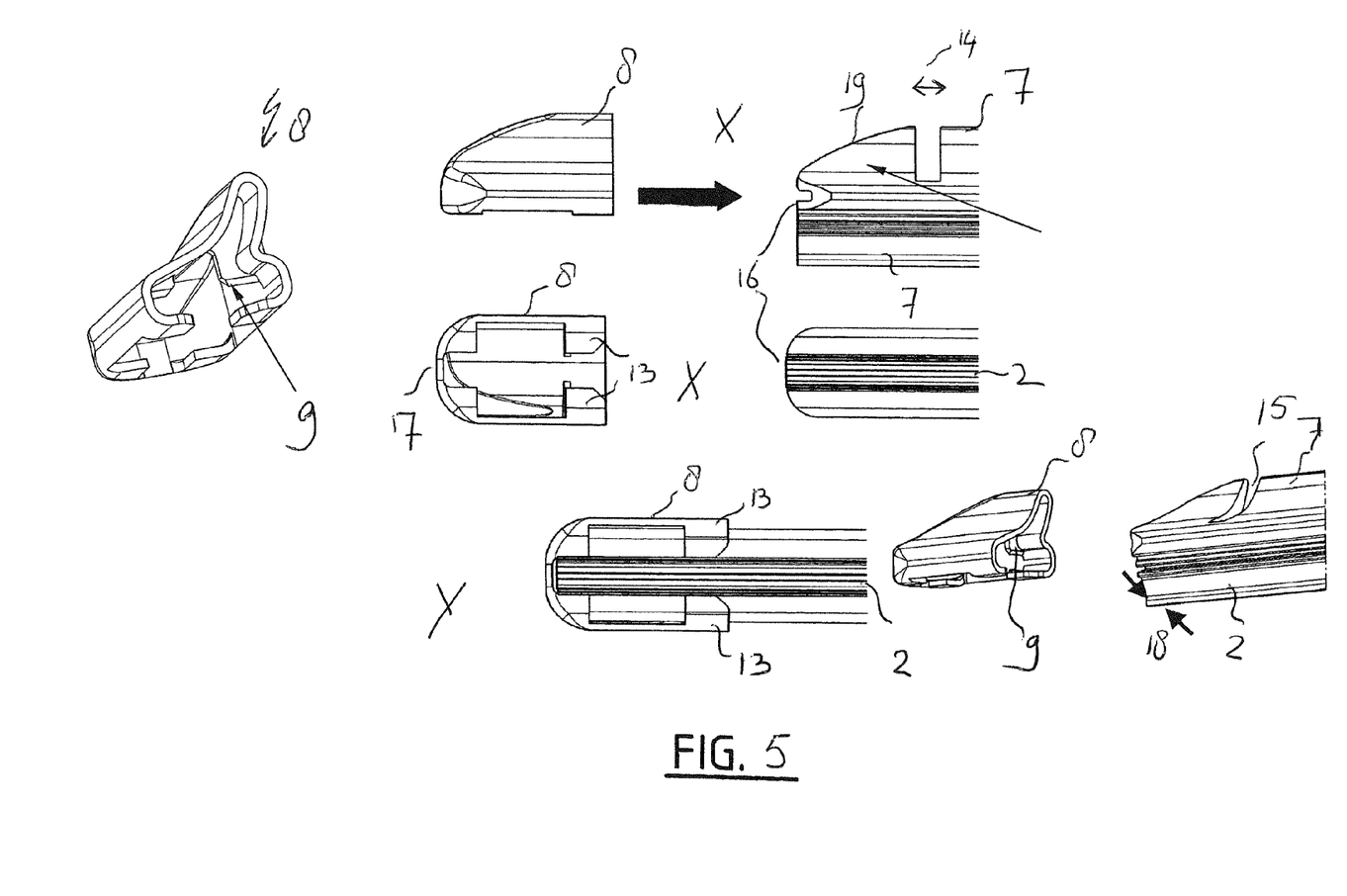
FIG. 5 in steps shows how the end cap of embodiment B is mounted onto a respective free end of a wiper blade used in the windscreen wiper device of FIG. 1.

FIG. 5 corresponds to FIGS. 3 and 4, wherein corresponding parts have been designated with the same reference numerals, on the understanding that in FIG. 5 a part of the spoiler 7 extending from the free end of the wiper blade 2 to the slit 15 has an inclined upper surface 19 having a certain curvature.

Figure 6:
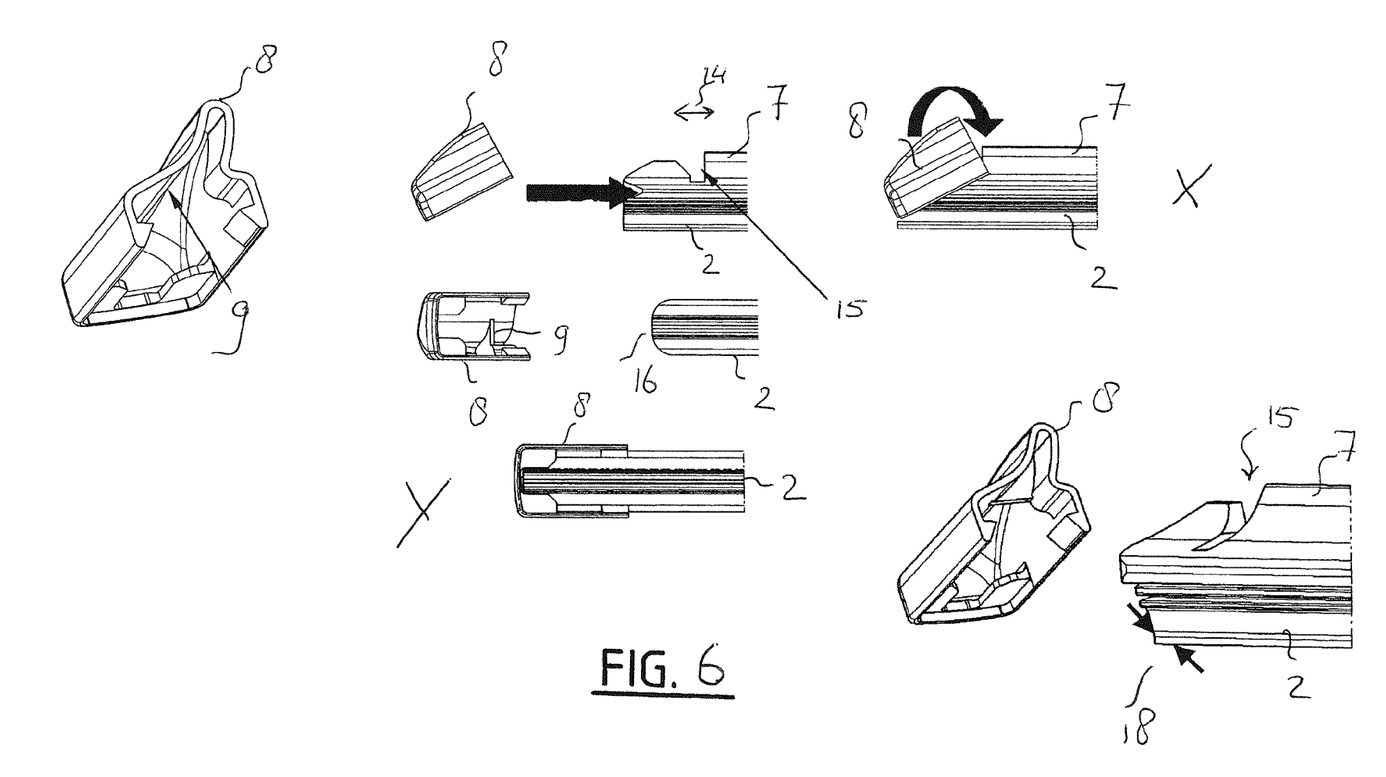
FIG. 6 in steps shows how the end cap of embodiment C is mounted onto a respective free end of a wiper blade used in the windscreen wiper device of FIG. 1.

FIG. 6 corresponds to FIGS. 3, 4 and 5, wherein corresponding parts have been designated with the same reference numerals, on the understanding that in FIG. 6 the connecting piece 8 is connected to the wiper blade 2 by rotating the connecting piece 8 onto the wiper blade 2 (side view of situation X) until the reinforcement rib 9 rests inside the transverse slit 15 (bottom view of situation Y). Glue may be used to further retain the end cap 8 onto the wiper blade 2.

Although not shown in FIGS. 1, 2 and 3, but fully understood by a skilled person, the oscillating arm 6 is connected to a mounting head fixed for rotation to a shaft driven by a small motor. In use, the shaft rotates alternately in a clockwise and in a counter-clockwise sense carrying the mounting head into rotation also, which in turn draws the oscillating arm 8 into rotation and by means of the connecting device 5 moves the wiper blade 2.

The invention is not restricted to the embodiments shown, but also extends to other preferred embodiments falling within the scope of the appended claims.

The invention claimed is:

1. A windscreen wiper device of the flat blade type comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein free ends of said wiper blade are connected to a respective connecting piece, which windscreen wiper device comprises a connecting device for an oscillating wiper arm, and wherein said wiper blade is provided with a spoiler at a side thereof facing away from said windscreen to be wiped, wherein said at least one connecting piece comprises an internal transverse reinforcement rib, wherein said spoiler is removed along a portion of the length of said wiper blade at a distance from a free end of said wiper blade facing said connecting piece so as to form a transverse slit and a ramped upper surface inclining from said free end toward said slit, and wherein said reinforcement rib of said at least one connecting piece is slideable along said ramped surface and receivable with a snap fit into said slit when in a mounted position.

2. A windscreen wiper device according to claim 1, wherein the height of said slit corresponds to the height of said internal transverse reinforcement rib.

3. A windscreen wiper device according to claim 2, wherein a part of said spoiler extending from the free end of said wiper blade to said slit has said inclined upper ramped surface.

4. A windscreen wiper device according to claim 3, wherein said inclined upper surface is straight.

5. A windscreen wiper device according to claim 1, wherein the height of said slit is larger than the height of said internal transverse reinforcement rib.

6. A windscreen wiper device according to claim 5, wherein a part of said spoiler extending from the free end of said wiper blade to said slit has said inclined upper ramped surface.

7. A windscreen wiper device according to claim 6, wherein said inclined upper ramped surface is straight.

8. A windscreen wiper device according to claim 1, wherein upon mounting of said connecting piece said wiper blade at a location facing said connecting piece is pulled longitudinally outwardly so as to allow said internal transverse reinforcement rib to move into said transverse slit.

9. A windscreen wiper device according to claim 1, wherein said connecting piece is connected to said wiper blade by a snapping operation by sliding said connecting piece onto said wiper blade in longitudinal direction thereof until said reinforcement rib snaps into said transverse slit.

10. A windscreen wiper device according to claim 1, wherein said connecting piece is connected to said wiper blade by rotating said connecting piece onto said wiper blade until said reinforcement rib rests inside said transverse slit.

11. A windscreen wiper device according to claim 1, wherein said connecting piece comprises engaging members sidewardly engaging said wiper blade from the outside, wherein said engaging members comprise retaining structure for retaining said wiper blade onto said connecting piece.

12. A windscreen wiper device according to claim 11, wherein said engaging members and said retaining structure are in one piece.

13. A windscreen wiper device according to claim 12, wherein said engaging members and said retaining structure are formed by inwardly bent parts of edges of lateral sides of said connecting piece.

14. A windscreen wiper device according to claim 11, wherein a cross plane through a free end of said internal transverse reinforcement rib extends through said retaining structure.

15. A windscreen wiper device according to claim 11, wherein said retaining structure comprises at least one sidewardly extending gripping tooth for gripping an intermediate web of said wiper blade.

* * * * *